(12) United States Patent
Egawa

(10) Patent No.: US 9,618,767 B2
(45) Date of Patent: Apr. 11, 2017

(54) PROJECTOR

(71) Applicant: SEIKO EPSON CORPORATION, Tokyo (JP)

(72) Inventor: Akira Egawa, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/613,903

(22) Filed: Feb. 4, 2015

(65) Prior Publication Data

US 2015/0226976 A1    Aug. 13, 2015

(30) Foreign Application Priority Data

Feb. 10, 2014    (JP) ................... 2014-023655

(51) Int. Cl.
  *G03B 21/00*    (2006.01)
  *G02B 27/48*    (2006.01)
  *H04N 9/31*    (2006.01)

(52) U.S. Cl.
  CPC ........... *G02B 27/48* (2013.01); *H04N 9/3161* (2013.01)

(58) Field of Classification Search
  CPC ......... G03B 21/00; G09G 3/001; G02B 27/48
  USPC .................................. 359/457, 459; 353/30
  See application file for complete search history.

(56) References Cited

U.S. PATENT DOCUMENTS

2005/0030622 A1\* 2/2005 Morita ................ G02B 27/225
                                                          359/464
2012/0086917 A1    4/2012 Okuda et al.

FOREIGN PATENT DOCUMENTS

JP    2011-180281 A    9/2011

\* cited by examiner

*Primary Examiner* — Steven H Whitesell Gordon
*Assistant Examiner* — Jerry Brooks
(74) *Attorney, Agent, or Firm* — Oliff PLC

(57) ABSTRACT

A projector includes an illumination device adapted to emit a plurality of light beams, which includes a first light beam and a second light beam, as illumination light, a liquid crystal light valve, and a projection optical system adapted to project image light, which is emitted from the liquid crystal light valve, on a screen. The image light is formed of a plurality of diffracted light beams and a plurality of zero-order light beams, which are generated by the illumination light and the liquid crystal light valve. In the exit pupil, an illuminance peak due to the zero-order light beam corresponding to the first light beam is disposed at a position different from a position of an illuminance peak due to the diffracted light beam corresponding to the second light beam.

5 Claims, 9 Drawing Sheets

PROJECTOR

BACKGROUND

1. Technical Field

The present invention relates to a projector.

2. Related Art

Projectors using a laser source have an advantage that miniaturization of the device can be achieved, an advantage of being superior in color reproducibility, and advantage that instantaneous lighting can be performed, an advantage that the life of the light source is long, and other advantages. Incidentally, the laser beam emitted from the laser source is generally a coherent light beam. Therefore, in the projectors of this kind, there are some cases in which a speckled pattern caused by interference of the laser beams, a so-called speckle, is visually recognized on a screen. This significantly degrades the display quality.

In the projector using a laser source, there are taken measures for suppressing the degradation of the display quality due to the speckle. In JP-A-2011-180281 (Document 1), there is disclosed a projection video display device equipped with an equalizing optical element (a diffusing optical element), which equalizes the spatial distribution of the light intensity in the exit pupil of a projection optical system, and is disposed between a light source and a light modulation element.

Although the projection video display device of Document 1 is equipped with the equalizing optical element, the effect for reducing the speckles obtained by merely providing the equalizing optical element is still insufficient.

SUMMARY

An advantage of some aspects of the invention is to provide a projector capable of sufficiently reducing the speckles, and thus superior in display quality.

A projector according to an aspect of the invention includes an illumination device adapted to emit a plurality of light beams, which includes a first light beam and a second light beam, as illumination light, a light modulation device adapted to modulate the illumination light to thereby generate image light, and a projection optical system having an exit pupil and adapted to project the image light, which is emitted from the light modulation device, on a projection target surface, the image light is formed of a plurality of diffracted light beams and a plurality of zero-order light beams, which are generated by the illumination light and the light modulation device, and in the exit pupil, an illuminance peak due to the zero-order light beam corresponding to the first light beam is disposed at a position different from a position of an illuminance peak due to the diffracted light beam corresponding to the second light beam.

The inventors have found out the fact that the larger the variation in the illuminance distribution is, the more easily the speckle is visually recognized as in the case in which the plurality of images of the image light is discretely arranged in the exit pupil of the projection optical system, and further, by enhancing the dispersibility of the plurality of images of the image light, a pseudo single image is formed in the exit pupil, and the smaller the variation in the illuminance distribution is, the more difficult it becomes to visually recognize the spackle. Further, the inventors has focused attention on the fact that the light modulation device also functions as a diffraction grating, and the image light emitted from the light modulation device includes a zero-order light beam and diffracted light beams. Therefore, the inventors has realized the fact that in order to reduce the variation in illuminance distribution in the exit pupil, it is necessary to consider the arrangement of both of the illuminance peak (image) due to the zero-order light beam and the illuminance peaks due to the diffracted light beams. It should be noted that in the present specification, a peak of the illuminance distribution is referred to as an illuminance peak. In Document 1 described above, the influence of the diffracted light beams generated in the light modulation device is not at all considered.

According to the projector related to the aspect of the invention, in the exit pupil, the illuminance peak due to the zero-order light beam corresponding to the first light beam is disposed at a position different from a position of the illuminance peak due to the diffracted light beam corresponding to the second light beam. Thus, since the dispersibility of the plurality of illuminance peaks in the exit pupil of the projection optical system is enhanced, the variation in illuminance distribution becomes small, and the speckle can be reduced.

The projector according to the aspect of the invention may be configured such that assuming that a direction, in which a plurality of illuminance peaks due to the plurality of diffracted light beams is arranged in the exit pupil, is a first direction, the first direction intersects with direction, in which a plurality of illuminance peaks due to the plurality of zero-order light beams is arranged, in the exit pupil.

According to this configuration, since the first direction in which the plurality of illuminance peaks due to the plurality of diffracted light beams is arranged and the direction in which the plurality of illuminance peaks due to the plurality of zero-order light beams is arranged intersect with each other, the rate at which the illuminance peak due to the zero-order light beam of the first light beam and the illuminance peak due to the diffracted light beam of the second light beam are disposed at respective positions different from each other rises.

The projector according to the aspect of the invention may be configured such that the illumination device is provided with a plurality of light sources, and the direction, in which the plurality of illuminance peaks due to the plurality of zero-order light beams is arranged, coincides with a direction, in which the plurality of light sources is arranged, in a plane perpendicular to an illumination light axis of the illumination device.

According to this configuration, since the direction in which the plurality of illuminance peaks due to the plurality of zero-order light beams is arranged coincide with the direction in which the plurality of light sources in a plane perpendicular to the illumination light axis is arranged, the arrangement direction of the plurality of light sources intersects with the arrangement direction of the plurality of illuminance peaks due to the plurality of diffracted light beams, namely the diffraction direction of the light beams. By using the illumination device having the plurality of light sources arranged as described above, the speckle can be reduced.

The projector according to the aspect of the invention may be configured such that the illumination device is provided with a lens array having a plurality of lenses arranged, and the direction, in which the plurality of illuminance peaks due to the plurality of zero-order light beams is arranged, coincides with a direction, in which the plurality of lenses is arranged, in a plane perpendicular to an illumination light axis of the illumination device.

According to this configuration, since the direction in which the plurality of illuminance peaks due to the plurality of zero-order light beams is arranged coincide with the direction in which the plurality of lenses in a plane perpendicular to the illumination light axis is arranged, the arrangement direction of the plurality of lenses intersects with the arrangement direction of the plurality of illuminance peaks due to the plurality of diffracted light beams, namely the diffraction direction of the light beams. By using the lens array having the plurality of lenses arranged as described above, the speckle can be reduced.

The projector according to the aspect of the invention may be configured such that, in the exit pupil, a distance between a first illuminance peak and a second illuminance peak adjacent to each other in the first direction is different from a distance between the first illuminance peak and a third illuminance peak adjacent to each other in the first direction, the first illuminance peak, the second illuminance peak and the third illuminance peak being due to the plurality of zero-order light beams.

According to this configuration, since the regularity of the arrangement of the plurality of illuminance peaks is broken, the variation in illuminance distribution becomes apparently small. As a result, the speckle can be reduced.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be explained using FIGS. 1, 2A, 2D, 2C, 3A, 3B, 3C, 4A, and 4B.

In the present embodiment, an example of a projector using an illumination device provided with a laser source will be described.

Figure 1:
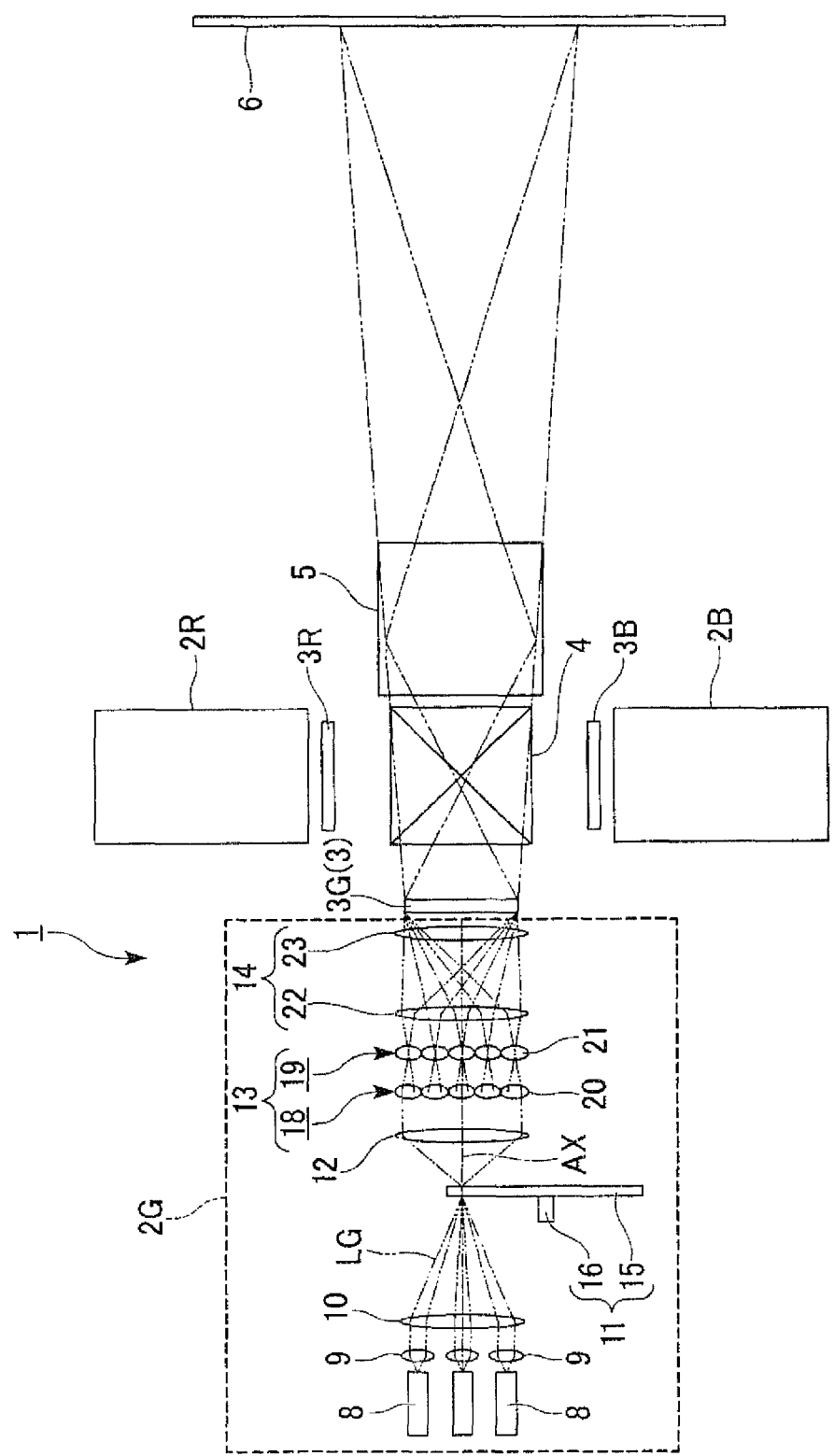
FIG. 1 is a general configuration diagram showing a projector according to a first embodiment of the invention.

FIG. 1 is a schematic configuration diagram showing the projector according to the first embodiment.

It should be noted that in each the following drawings, the constituents are shown with the scale ratios of respective sizes set differently between the constituents in some cases in order to facilitate the visualization of each of the constituents.

As shown in FIG. 1, the projector 1 is provided with a red-light illumination device 2R, a green-light illumination device 2G, a blue-light illumination device 2B, a red-light liquid crystal light valve 3R, a green-light liquid crystal light valve 3G, a blue-light liquid crystal light valve 3B, a color combining element 4, and a projection optical system 5.

The red-light illumination device 2R, the green-light illumination device 2G, and the blue-light illumination device 2B of the present embodiment correspond to an illumination device of the appended claims. The red-light liquid crystal light valve 3R, the green-light liquid crystal light valve 3G, and the blue-light liquid crystal light valve 3B of the present embodiment correspond to a light modulation device of the appended claims.

In general, the projector 1 operates as follows. A red laser beam emitted from the red-light illumination device 2R enters the red-light liquid crystal light valve 3R and is then modulated. Similarly, a green laser beam LG emitted from the green-light illumination device 2G enters the green-light liquid crystal light valve 3G and is then modulated. A blue laser beam emitted from the blue-light illumination device 2B enters the blue-light liquid crystal light valve 3B and is then modulated. The red laser beam modulated by the red-light liquid crystal light valve 3R, the green laser beam LG modulated by the green-light liquid crystal light valve 30, and the blue laser beam modulated by the blue-light liquid crystal light valve 3B enter the color combining element 4, and are then combined with each other. The light the image light) combined by the color combining element 4 is projected on a screen 6 by the projection optical system 5 in an enlarged manner. In such a manner, a full-color projection image is displayed.

Hereinafter, each of the constituents of the projector 1 will be explained. The red-light illumination device 2R, the green-light illumination device 2G, and the blue-light illumination device 2B are different from each other only in color of the light to be emitted, and are the same in configuration. Therefore, hereinafter, the green-light illumination device 2G will only be explained, and the explanation of the red-light illumination device 2R and the blue-light illumination device 2B will be omitted.

The green-light illumination device 2G emits a plurality of green light beams, which include a first light beam and a second light beam, as the illumination light. The green-light illumination device 2G is provided with a plurality of green-light laser sources 8, a plurality of collimating lenses 9, a collecting lens 10, a light diffusing device 11, a pickup lens 12, a lens array unit 13, and an overlapping optical system 14.

The green-light illumination device 2G is provided with the plurality of laser sources 8. Although three laser sources 8 are only shown in FIG. 1, the plurality of laser sources 8 is arranged not only in a direction parallel to the sheet of the drawing, but also in a direction perpendicular to the sheet, and is arranged in a matrix with a plurality of rows and a plurality of columns as a whole. The arrangement directions of the plurality of laser sources 8 coincide with the arrangement directions of a plurality of pixels of a liquid crystal panel described later.

The same applies to the configurations of the red-light illumination device 2R and the blue-light illumination device 2B. As an example, red-light laser sources each emit the light in a wavelength band of about 585 nm through 720 nm. The green-light laser sources each emit the light in a wavelength band of about 495 nm through 585 nm. Blue-light laser sources each emit the light in a wavelength band of about 380 nm through 495 nm.

Each of the laser sources 8 is provided with corresponding one of the collimating lenses 9. The green laser beam LG emitted from each of the green-light laser sources 8 enters the collimating lens 9, and is then collimated and then emitted therefrom. The same also applies to the red-light laser sources 7R and the blue-light laser sources 7B.

The laser beams LG emitted from the green-light laser sources 8 are transmitted through the collimating lenses 9, then collected by the collecting lens 10, and then enter the light diffusing device 11. The light diffusing device 11 enlarges the exit angle distribution of the light emitted from the light diffusing device 11 with respect to the incident angle distribution of the light entering the light diffusing device 11. The light diffusing device 11 is provided with a rotary diffusing plate 15 and a drive device 16. The rotary diffusing plate 15 can be formed of a light diffusing plate such as ground glass or a diffusing film, a diffractive optical element such as a holographic diffuser, and so on.

The rotary diffusing plate 15 has a rotary shaft (not shown) passing through the center of the rotary diffusing plate 15 and extending in a normal direction of the rotary diffusing plate 15. The rotary shaft is connected to an electric motor as the drive device 16 of the rotary diffusing plate 15. When the drive device 16 operates, the rotary diffusing plate 15 rotates around the rotary shaft. Since the light diffusing device 11 is disposed, the light distribution of the light projected on the screen 6 is homogenized, and thus the speckle is reduced. Further, by rotating the rotary diffusing plate 15, the spatial distribution of the speckle changing from moment to moment is temporally superimposed, and thus the speckle is further reduced. The light emitted from the light diffusing device 11 is roughly collimated by the pickup lens 12, and is then guided to the lens array unit 13.

The lens array unit 13 is constituted by two lens arrays formed of a first lens array 18 and a second lens array 19. The first lens array 18 has a configuration of arranging a plurality of lenses 20 in a plane perpendicular to an illumination light axis AX in a matrix with a plurality of rows and a plurality of columns. The first lens array 18 has a function as a light beam dividing optical element for dividing the light emitted from the pickup lens 12 into a plurality of partial light beams. Although the explanation using a graphical description is omitted, the outer shape of the lenses 20 is similar to the outer shape of the image forming area of the liquid crystal light valve 3G described later.

Assuming a bundle of the plurality of coherent light beams emitted from the plurality of laser sources 8 as a single light beam, the illumination light axis AX denotes the optical axis of the single light beam.

Similarly to the first lens array 18, the second lens array 19 has a configuration of arranging a plurality of lenses 21 in the plane perpendicular to the illumination light axis AX in a matrix with a plurality of rows and a plurality of columns. The second lens array 19, in conjunction with the overlapping optical system 14 in a posterior stage, has a function of focusing the image of each of the lenses 20 of the first lens array 18 in the vicinity of the image forming area of the liquid crystal light valve 3G.

The overlapping optical system 14 is formed of at least one overlapping lens. The overlapping optical system 14 overlaps the plurality of light beams, which have been emitted from the second lens array 19, on the liquid crystal light valve 3G as an illumination target area. Here, there is described an example of the overlapping optical system 14 formed of two overlapping lenses, namely a first overlapping lens 22 and a second overlapping lens 23. The plurality of light beams as the green laser beams LG having been emitted from the second lens array 19 enter the green-light liquid crystal light valve 3G via the overlapping optical system 14. The plurality of light beams is overlapped with each other on the green-light liquid crystal light valve 3G by the overlapping optical system 14. Thus, the luminance distribution in the green-light liquid crystal light valve 3G is homogenized, and at the same time, the axisymmetric property around the ray axis is improved.

Although not shown in the drawing, the green-light liquid crystal light valve 3G is provided with a liquid crystal panel having a liquid crystal layer held between a pair of glass substrates, a light entrance side polarization plate disposed on the light entrance side of the liquid crystal panel, and a light exit side polarization plate disposed on the light exit side of the liquid crystal panel. The operation mode of the liquid crystal is not particularly limited, but can be a TN mode, a VA mode, a transverse electric field mode, and so on. The red-light liquid crystal light valve 3R and the blue-light liquid crystal light valve 3B each have substantially the same configuration.

The color combining element 4 is formed of a cross dichroic prism or the like. The cross dichroic prism has a structure having four triangular prisms bonded to each other. The surfaces of the triangular prisms bonded to each other form internal surfaces of the cross dichroic prism. In the internal surfaces of the cross dichroic prism, a mirror surface reflecting the red light and transmitting the green light, and a mirror surface reflecting the blue light and transmitting the green light are perpendicular to each other. The green light having entered the cross dichroic prism is transmitted through the mirror surfaces, and is emitted directly. The red light and the blue light having entered the cross dichroic prism are selectively reflected by the mirror surfaces, and are then emitted in the same direction as the emission direction of the green light. In such a manner as described above, the three colored light beams are overlapped to thereby be combined with each other, and the colored light beam obtained by the combination is emitted toward the projection optical system 5.

In the following explanation, the green-light liquid crystal light valve 3G is referred to as a liquid crystal light valve 3.

Figure 2C:
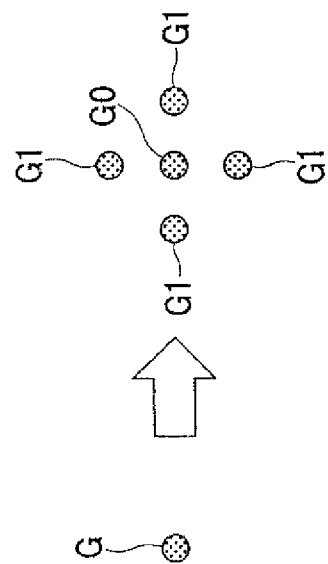
FIG. 2A is a front view of a liquid crystal light valve of the embodiment.
FIG. 2B is a diagram showing how the light transmitted through the liquid crystal light valve is diffracted in the embodiment.
FIG. 2O is a diagram showing a diffraction pattern generated by the diffraction in the embodiment.
Figure 2B:
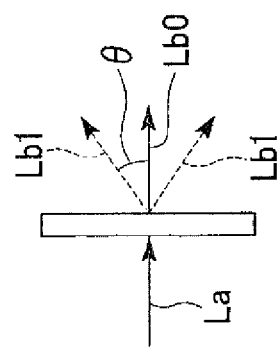
Figure 2A:
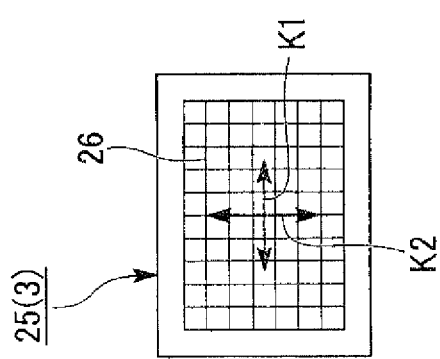

FIG. 2A is a front view of the liquid crystal light valve 3. FIG. 2B is a diagram showing how one light beam transmitted through the liquid crystal light valve 3 is diffracted. FIG. 2C is a diagram showing a diffraction pattern caused by the diffraction.

As shown in FIG. 2A, a liquid crystal panel 25 constituting the liquid crystal light valve 3 is provided with a light blocking film having a grid-like shape, namely a so-called black matrix 26 or a microlens array (not shown). The black matrix 26 is for blocking the light from the wiring and TFT, and at the same time, defining a plurality of pixel areas. The microlens array is formed of a plurality of microlenses arranged in a matrix, and is for collecting light in an opening section of the black matrix 26. The liquid crystal panel 25 has a microscopic pattern having a grid-like shape of this kind, and therefore functions as a diffraction grating with respect to the transmitted light.

As shown in FIG. 2B, when the light enters the liquid crystal panel 25, both of a zero-order light beam Lb0 not diffracted by the liquid crystal panel 25 and first-order diffracted light beams Lb1 generated by diffracting the light using the liquid crystal panel 25 are emitted. In other words, the image light generated by the liquid crystal panel 25 is formed of the illumination light emitted from the illumination device and the plurality of zero-order light beams and the plurality of diffracted light beams generated by the liquid crystal panel 25.

It should be noted that in FIG. 2B, ±first-order diffracted light beams (with the symbol of Lb1) are only shown, and higher-order diffracted light beams are omitted. An angle formed between the center axis of the zero-order light beam Lb0 and the center axis of the diffracted light beams (e.g., +first-order diffracted light Lb1) is referred to as a diffraction angle θ.

As shown in FIG. 2A, when viewing the liquid crystal panel 25 from the normal direction, the black matrix 26 is disposed along a horizontal direction and a vertical direction. Therefore, the directions in which the incident light beam La (see FIG. 2B) is mainly diffracted are the horizontal direction and the vertical direction of the liquid crystal panel 25 as indicated by the arrows K1, K2. In the following explanation, the directions in which the incident light beam La is mainly diffracted are referred to as diffraction directions.

Therefore, as shown in FIG. 2C, in the case in which one image (an illuminance peak) G of the illumination light exists at the moment before the light enters the liquid crystal panel 25, an image (an illuminance peak) G0 of the zero-order light beam and images (illuminance peaks) G1 by the diffracted light in the diffraction directions (in the horizontal direction and the vertical direction) are formed at the moment after the light transmitted through the liquid crystal panel 25, and as a result, the number of images increases as a whole.

Although there also exist the higher-order diffracted light beams than the first-order and the diffracted light beams diffracted in directions other than the horizontal direction or the vertical direction of the liquid crystal panel in reality, the ±first-order diffracted light beams diffracted in the horizontal direction and the ±first-order diffracted light beams diffracted in the vertical direction are considered here as the principal diffracted light beams having the most significant effect. In the example shown in FIG. 2C, the four images G1 due to the diffracted light beams are formed on the left, right, top, and bottom of the one image G0 due to the zero-order light beam. In the case of using the laser source, since the wavelength of the emitted light is unique, and the diffraction angle θ is uniquely determined, the images G1 due to the diffracted light beams are clearly formed.

In the case of the projector using the laser source, a phenomenon equivalent to the interference phenomenon occurring on the screen occurs on a retina of an eye. The observer feels the interference phenomenon on the retina as the speckle. The inventors focus attention on the fact that the occurrence status of the speckle and the illuminance distribution in the exit pupil of the projection optical system correlate with each other.

Figure 4A:
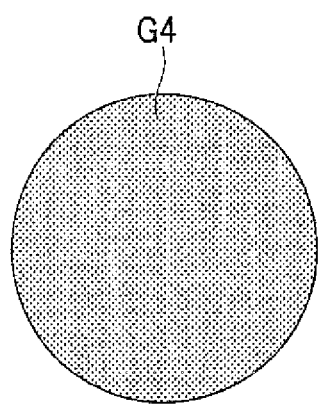
FIG. 4A is a diagram showing a preferred example of an exit pupil image.
Figure 4B:
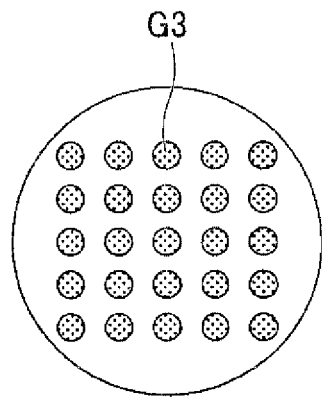
FIG. 4B is a diagram showing an undesirable example of the exit pupil image in the embodiment.

FIGS. 4A and 4B are each a schematic diagram showing the illuminance distribution in the exit pupil. The area provided with hatching represents an area high in illuminance. FIG. 4A shows an example in which the dispersibility of the plurality of images of the image light is enhanced to thereby form a pseudo single image G4, and thus, the variation in illuminance distribution is small. FIG. 4B shows an example in which a plurality of images G3 of the image light is discretely arranged, and thus, the variation in illuminance distribution is large. The inventors have found out the fact that the larger the variation in the illuminance distribution is, the more easily the speckle is visually recognized as in the case in which the plurality of images G3 of the image light is discretely arranged in the exit pupil as shown in FIG. 4B, and further, by enhancing the dispersibility of the plurality of images of the image light, the pseudo single image G4 is formed in the exit pupil as shown in FIG. 4A, and the smaller the variation in the illuminance distribution is, the more difficult it becomes to visually recognize the spackle.

The influence of the diffraction by the liquid crystal panel 25 explained using FIGS. 2A through 2C will further be explained below while applying the influence to the configuration of the projector 1.

Figure 3A:
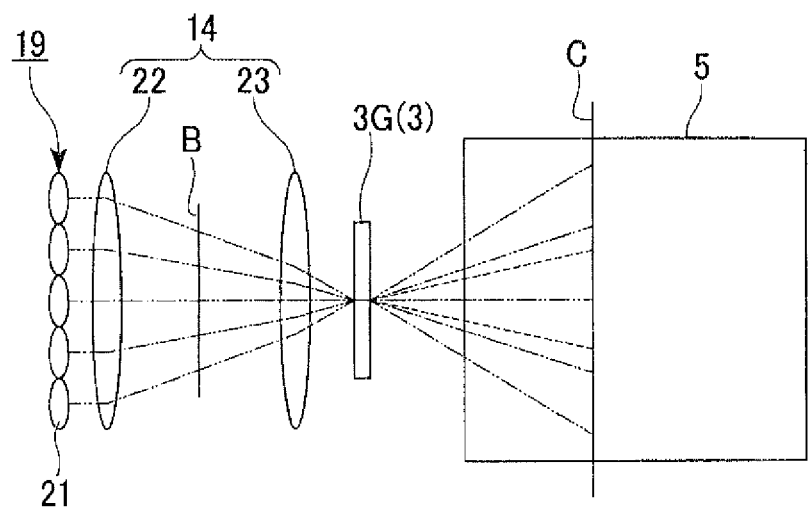
FIG. 3A is a diagram showing in more detail how the light transmitted through the liquid crystal light valve is diffracted in the embodiment.
Figure 3B:
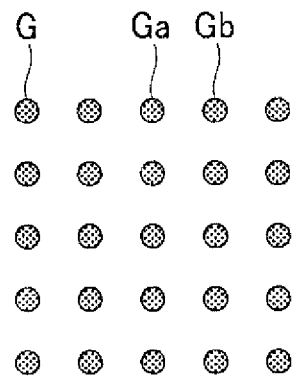
FIG. 3B is a diagram showing an image formed at the position denoted with the symbol B shown in FIG. 3A.
Figure 3C:
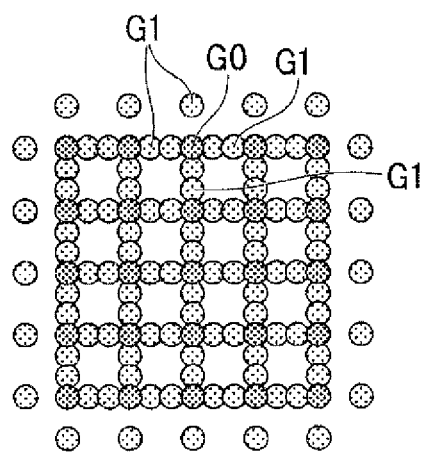
FIG. 3C is a diagram showing an image formed at the position denoted with the symbol C shown in FIG. 3A.

FIG. 3A is a diagram showing in detail how the light transmitted through the liquid crystal panel 25 is diffracted. FIG. 3B is a diagram showing an arrangement of the plurality of images G of the illumination light beams, which has been emitted from the second lens array 19, at the position of the symbol B shown in FIG. 3A. FIG. 3C is a diagram showing an arrangement of the plurality of images of the image light in the exit pupil (at the position of the symbol C) of the projection optical system 5 shown in FIG. 3A.

In FIG. 3B, although the images of the illumination light are denoted by the symbol G, the positions of the images C can be recognized as the positions of the illuminance peaks of the illumination light. Similarly, in FIG. 3C, although the plurality of images of the image light are denoted by the symbols G0, G1, the positions of the images G0, G1 can be recognized as the positions of the illuminance peaks in the exit pupil.

As shown in FIG. 3A, the second lens array 19 and the exit pupil C of the projection optical system 5 are in a conjugate relation with respect to the overlapping optical system 14. Therefore, the images of the second lens array 19 are formed in the exit pupil C of the projection optical system 5. In this example, it is assumed that totally 25 images G of the illumination light arranged in a 5×5 matrix are formed in the second lens array 19 as shown in FIG. 3B.

When the pitch of the lenses 21 adjacent to each other of the second lens array 19 varies, the incident angle of each of the plurality of light beams entering the liquid crystal panel 25 varies. When the incident angle of each of the plurality of light beams with respect to the liquid crystal panel 25 varies, the positions of the image G0 of the zero-order light beam and the images G1 of the diffracted light beams corresponding to the light beams vary. Therefore, the positions of the image G0 of the zero-order light beam and the images G1 of the diffracted light beams corresponding to the light beams can be adjusted using the pitch between the lenses 21 adjacent to each other of the second lens array 19.

It is assumed that the light beam corresponding to any one of the illuminance peaks shown in FIG. 3B (e.g., the image Ga at the center of the top line) is a first light beam, and the light beam corresponding to the illuminance peak (e.g., the image Gb on the right hand) adjacent to the illuminance peak is a second light beam. Here, when taking the diffraction by the liquid crystal panel 25 into consideration, if it is assumed that the illuminance peak (the image G0) due to the zero-order light beam of the first light beam and the illuminance peaks (the images G1) due to the diffracted light beams of the second light beam overlap each other in the exit pupil C of the projection optical system 5, it results that the plurality of illuminance peaks are discretely arranged, and the variation in illuminance distribution is becomes large. As a result, it becomes easy to visually recognize the speckle.

In contrast, according to the present embodiment, in the exit pupil C of the projection optical system, the illuminance peak (the image G0) due to the zero-order light beam of the first light beam and the illuminance peaks (the images G1) due to the diffracted light beams of the second light beam are disposed at respective positions different from each other as shown in FIG. 3C. Thus, the dispersibility of the plurality of illuminance peaks in the exit pupil C is enhanced compared to the case in which the illuminance peak due to the zero-order light beam of the first light beam and the illuminance peaks due to the diffracted light beams of the second light beam overlap each other, and therefore, the variation in illuminance distribution becomes small. As a result, it becomes difficult to visually recognize the speckle.

Second Embodiment

Figure 6:
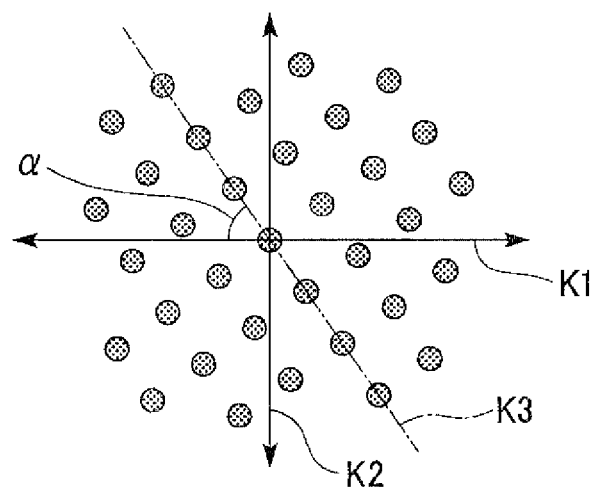
FIG. 6 is a front view showing an arrangement of a plurality of laser sources constituting an illumination device of the embodiment.
Figure 7:
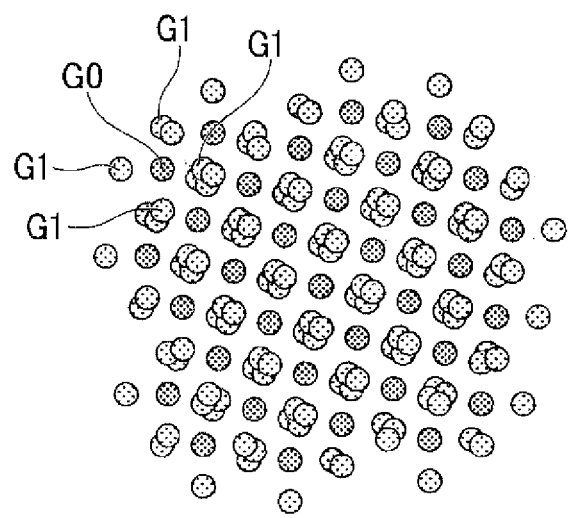
FIG. 7 is a diagram showing an exit pupil image in the embodiment.

A second embodiment of the invention will hereinafter be explained using FIGS. 5 through 7.

The basic configuration of a projector 31 according to the second embodiment is roughly the same as that in the first embodiment, and the configuration of the illumination device is different from that of the first embodiment.

Figure 5:
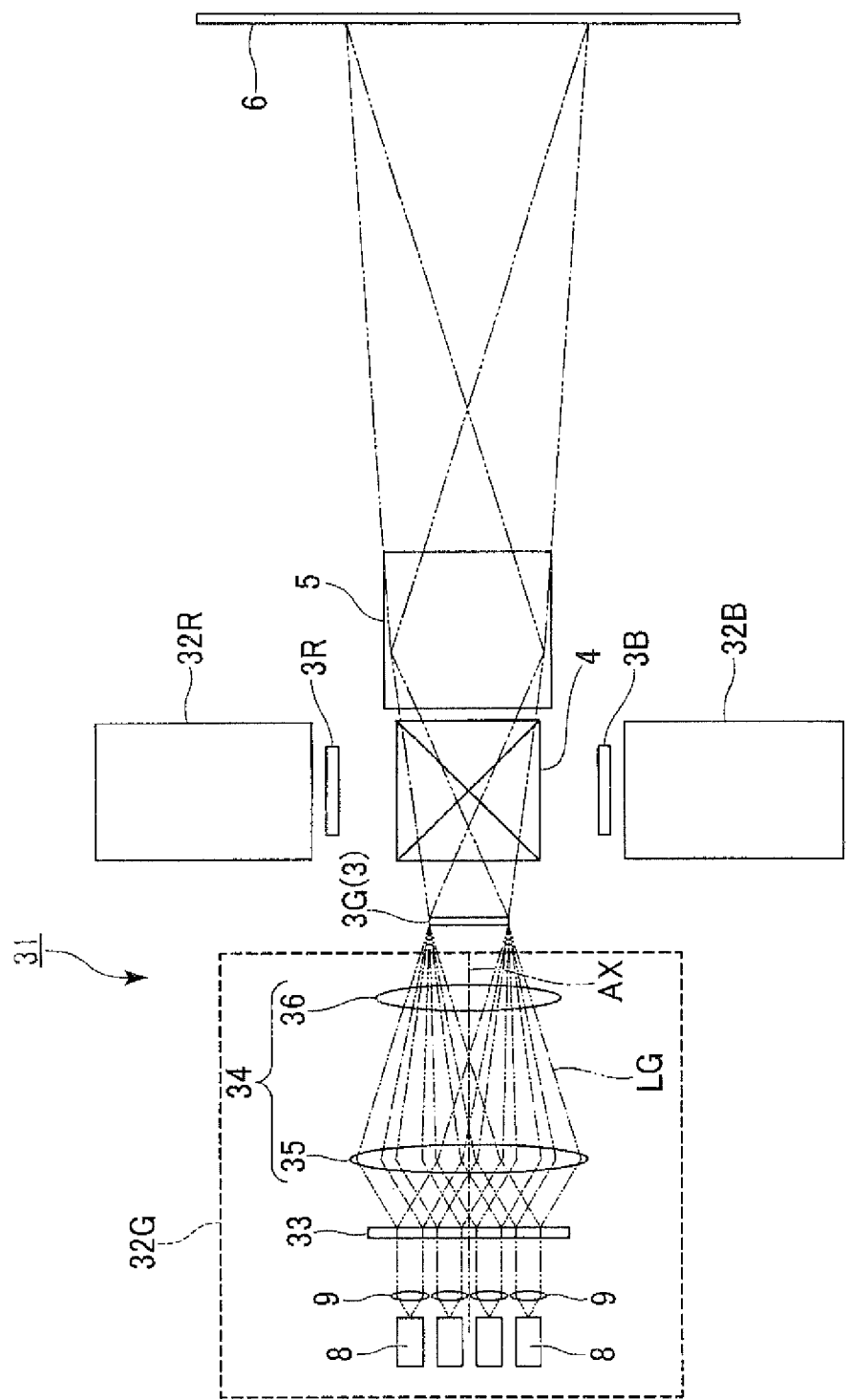
FIG. 5 is a general configuration diagram showing a projector according to a second embodiment of the invention.

FIG. 5 is a schematic configuration diagram showing the projector 31 according to the second embodiment.

In FIG. 5, the constituents common to FIG. 1 used in the description of the first embodiment are denoted with the same reference symbols, and the detailed explanation thereof will be omitted.

As shown in FIG. 5, a green-light illumination device 32G of the second embodiment emits a plurality of green light beams, which include a first light beam and a second light beam, as the illumination light. The green-light illumination device 32G is provided with the plurality of laser sources 8, the plurality of collimating lenses 9, a diffractive optical element 33, and an overlapping optical system 34. The configurations of the collimating lenses 9 and the overlapping optical system 34 is substantially the same as in the first embodiment. The configurations of the red-light illumination device 32R and the blue-light illumination device 32B are substantially the same as that of the green-light illumination device 32G, and the explanation thereof will be omitted.

The green laser beams LG emitted from the collimating lenses 9 enter the diffractive optical element 33. The diffractive optical element 33 is formed of a computer generated hologram (CGH). The CGH is a surface-relief hologram element having a fine concave-convex pattern, which is designed by a computer, disposed on a surface of a base member made of a light-transmissive material such as quartz (glass) or synthetic resin. The diffractive optical element 33 diffracts the laser beam having entered the diffractive optical element 33 to thereby homogenize the intensity distribution of the green laser beams LG entering the green-light liquid crystal light valve 3G. The diffracted light beams emitted from the diffractive optical element 33 enter the green-light liquid crystal light valve 3G through the overlapping optical system 34. The overlapping optical system 34 is formed of a first overlapping lens 35 and a second overlapping lens 36.

In the case of the second embodiment, the arrangement directions of the plurality of laser sources 8 do not coincide with the arrangement directions of the plurality of pixels of the liquid crystal panel, but are oblique to the arrangement directions of the plurality of pixels of the liquid crystal panel. Therefore, as shown in FIG. 6, the arrangement direction K3 of the plurality of laser sources 8 is oblique to the diffraction directions K1, K2. Assuming the angle formed between the arrangement direction K3 of the plurality of laser sources 8 and the diffraction direction K1 or the diffraction direction K2 is α, the angle α is set to an angle other than 45°. The direction, in which the plurality of illuminance peaks due to the plurality of zero-order light beams is arranged, coincides with the direction in which the plurality of laser sources 8 is arranged in a plane perpendicular to the illumination light axis AX.

According to the configuration described above, assuming that the direction in which the plurality of illuminance peaks due to the plurality of diffracted light beams is arranged in the exit pupil C of the projection optical system 5 is a first direction, the first direction intersects with the direction in which the plurality of illuminance peaks due to the plurality of zero-order light beams is arranged in the exit pupil C. If the angle α formed between the arrangement direction K3 of the plurality of laser sources 8 and the diffraction direction K1 or the diffraction direction K2 is, for example, 45°, the probability that the illuminance peak of one of the diffracted light beams overlaps the illuminance peak of one of the zero-order light beams rises. However, in the case of the present embodiment, since the angle α formed between the arrangement direction K3 of the plurality of laser sources 8 and the diffraction direction K1 or the diffraction direction K2 is set to an angle other than 45°, it becomes that the illuminance peak (the image G1) of one of the diffracted light beams and the illuminance peak (the image G0) of one of the zero-order light beams roughly do not overlap each other as shown in FIG. 7.

Also in the present embodiment, similarly to the first embodiment, the illuminance peak due to the zero-order light beam of the first light beam and the illuminance peaks due to the diffracted light beams of the second light beam are disposed at respective positions different from each other in the exit pupil C of the projection optical system 5. Thus, since the dispersibility of the plurality of illuminance peaks in the exit pupil C is enhanced, the variation in illuminance distribution becomes small, and as a result, the speckle becomes difficult to visually recognize.

Third Embodiment

A third embodiment of the invention will hereinafter be explained using FIGS. 8 and 9. The basic configuration of a projector according to the third embodiment is roughly the same as that in the first embodiment, and the configuration of the illumination device is different from that of the first embodiment.

Figure 8:
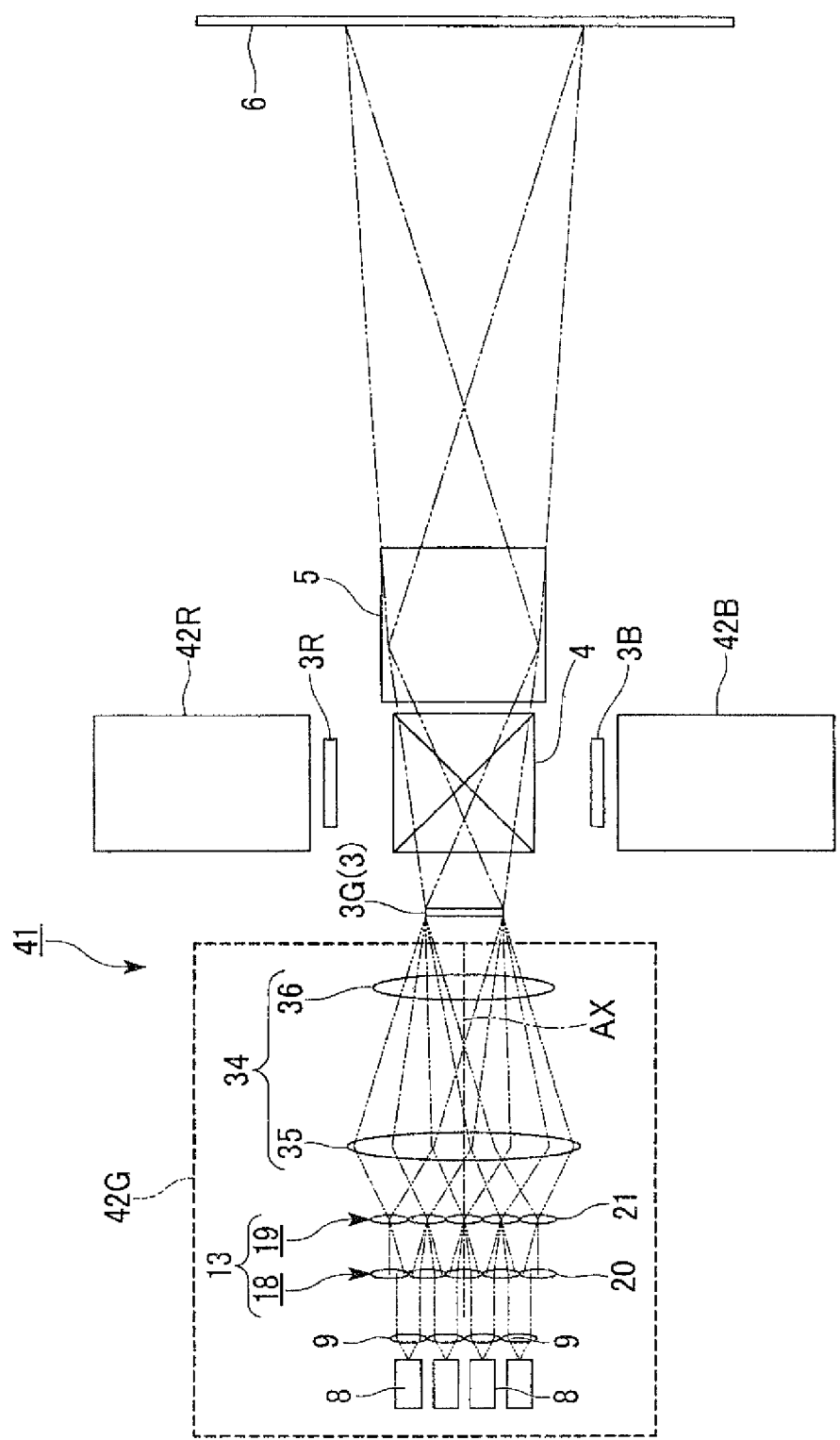
FIG. 8 is a general configuration diagram showing a projector according to a third embodiment of the invention.
Figure 9:
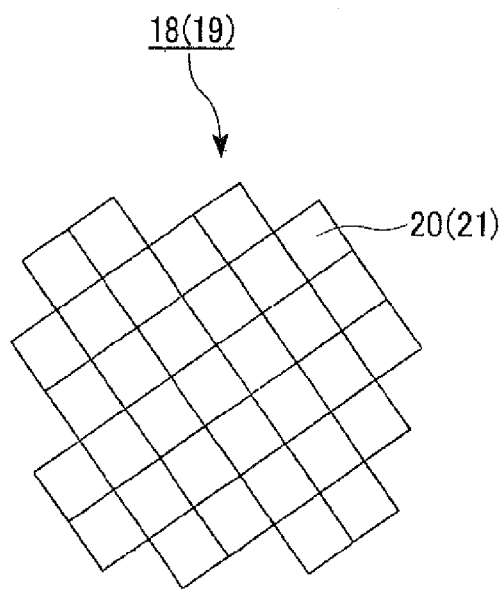
FIG. 9 is a front view showing an arrangement of a plurality of lenses constituting a lens array of the embodiment.

FIG. 8 is a schematic configuration diagram showing the projector 41 according to the third embodiment. In FIG. 8, the constituents common to FIG. 1 used in the description of the first embodiment are denoted with the same reference symbols, and the detailed explanation thereof will be omitted.

As shown in FIG. 8, a green-light illumination device 420 of the third embodiment emits a plurality of green light beams, which include a first light beam and a second light beam, as the illumination light. The green-light illumination device 420 is provided with the plurality of laser sources 8, the plurality of collimating lenses 9, the lens array unit 13, and the overlapping optical system 34. The configurations of the laser sources 8 and the collimating lenses 9 are substantially the same as in the first embodiment. The configuration of the overlapping optical system 34 is substantially the same as in the second embodiment. The configurations of a red-light illumination device 42R and a blue-light illumination device 42B are substantially the same as that of the green-light illumination device 42G, and the explanation thereof will be omitted.

The lens array unit 13 is constituted by the two lens arrays formed of the first lens array 18 and the second lens array 19. In the first embodiment, the plurality of lenses 20 provided to the first lens array 18 and the plurality of lenses 21 provided to the second lens array 19 are arranged in parallel to the arrangement direction of the plurality of pixels of the liquid crystal panel. In contrast, as shown in FIG. 9, in the present embodiment, the plurality of lenses 20 provided to the first lens array 18 and the plurality of lenses 21 provided to the second lens array 19 are arranged so as to intersect with the arrangement direction of the plurality of pixels of the liquid crystal panel in a plane perpendicular to the illumination light axis.

In the case of the present embodiment, the direction, in which the plurality of illuminance peaks due to the plurality of zero-order light beams is arranged, coincides with the direction, in which the plurality of lenses 20 and the plurality of lenses 21 are arranged in a plane perpendicular to the illumination light axis of the illumination device. According to this configuration, assuming that the direction in which the plurality of illuminance peaks due to the plurality of diffracted light beams is arranged in the exit pupil C of the projection optical system 5 is a first direction, the first direction intersects with the direction in which the plurality of illuminance peaks due to the plurality of zero-order light beams is arranged in the exit pupil C.

Also in the present embodiment, similarly to the first embodiment, the illuminance peak due to the zero-order light beam of the first light beam and the illuminance peaks due to the diffracted light beams of the second light beam are different from each other in the exit pupil C of the projection optical system 5. Thus, since the dispersibility of the plurality of illuminance peaks in the exit pupil C is enhanced, the variation in illuminance distribution becomes small, and as a result, the speckle becomes difficult to visually recognize.

Fourth Embodiment

A fourth embodiment of the invention will hereinafter be explained with reference to FIG. 10. In the fourth embodiment, there is described an example of a projector using a digital micromirror device (DMD) as the light modulation device.

Figure 10:
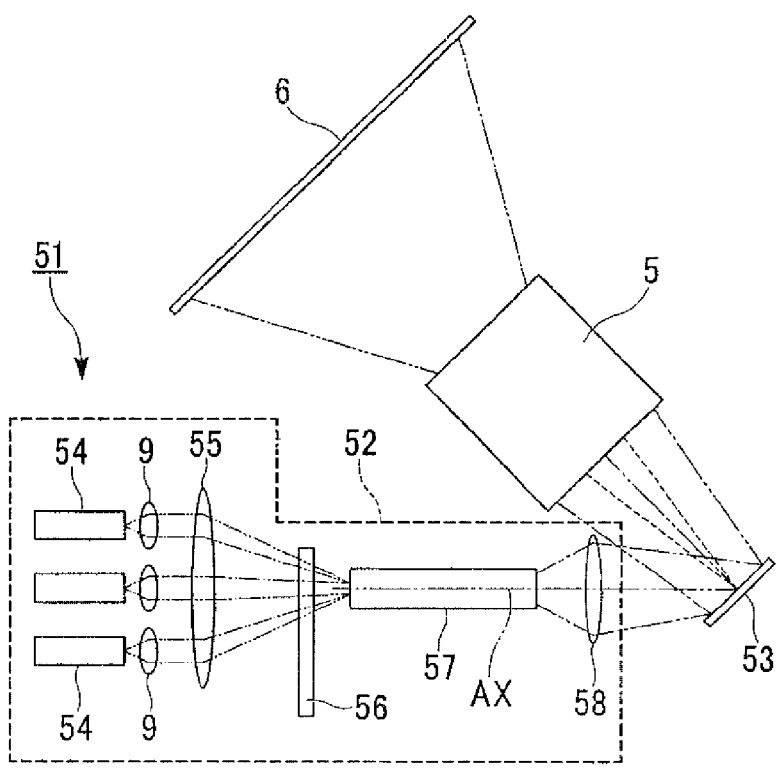
FIG. 10 is a general configuration diagram showing a projector according to a fourth embodiment of the invention.

FIG. 10 is a schematic configuration diagram showing the projector according to the fourth embodiment.

In FIG. 10, the constituents common to FIG. 1 used in the description of the first embodiment are denoted with the same reference symbols, and the detailed explanation thereof will be omitted.

As shown in FIG. 10, the projector 51 according to the fourth embodiment is provided with an illumination device 52, the DMD 53, and the projection optical system 5. The illumination device 52 is provided with a plurality of light sources 54, the plurality of collimating lenses 9, a first collecting lens 55, a color wheel 56, a rod lens 57, and a second collecting lens 58. The light sources 54 emit white light beams. In the present embodiment, as the light sources 54 for emitting the white light beams, there are used light sources each obtained by combining a laser source for emitting a blue light beam and a fluorescent material excited by a part of the blue light beam and emitting a yellow light beam with each other. The light sources 54 each emit the white light beam obtained by combining the yellow light beam and the blue light beam, which has not been used for the excitation, with each other.

The first collecting lens 55 makes the plurality of white light beams having been emitted from the plurality of light sources 54 enter a color filter (not shown) of the color wheel 56. The color wheel 56 is formed to have a disk-like shape, and a rotary shaft (not shown) is disposed at the center of the disk. A drive device (not shown) such as an electric motor is connected to the rotary shaft of the color wheel 56, and the color wheel 56 is rotationally driven in the circumferential direction by a drive device. The color wheel 56 is provided with color filters such as thin film interference filters for transmitting respective colored light beams of red, green, and blue disposed along the circumferential direction. The colored light beams of red, green, and blue are emitted from the color wheel 56 in a time-sharing manner.

On the light exit side of the color wheel 56, there is disposed the rod lens 57. As the rod lens 57, there is used a light transmissive light guide body formed of, for example, glass or resin, and having a rectangular cross-sectional shape perpendicular to the illumination light axis AX. Alternatively, as the rod lens 57, there is used a cylindrical light guide body having a plurality of reflecting surfaces disposed to form a cylindrical shape so as to surround the illumination light axis AX. The rod lens 57 homogenizes the illuminance of the plurality of light beams on the DMD 53. The second collecting lens 58 is disposed between the rod lens 57 and the DMD 53. The second collecting lens 58 makes the colored light beams, which have been emitted in a time-sharing manner, enter the DMD 53.

The DMD 53 has a configuration in which a plurality of micromirrors (not shown) corresponding respectively to the plurality of pixels is arranged in a matrix, and the direction of the reflecting surface of each of the micromirrors can be changed. By controlling the emission direction of each of the colored light beams input therein based on the video signal on which the signal processing has been performed, each of the colored light beams is separated into the modulated light beam projected on the screen 6 and invalid light beam not projected. Since the plurality of micromirrors corresponding to the plurality of pixels is also arranged in a matrix in the DMD 53, the diffracted light beams are generated in the arrangement direction of the pixels similarly to the liquid crystal panel. The projection optical device 5 projects the modulated light, which has been emitted from the DMD 53, on the screen 6 in an enlarged manner.

In the illumination device 52 of the fourth embodiment, similarly to the second embodiment, the arrangement direction of the plurality of light sources 54 does not coincide with the arrangement direction of the plurality of micromirrors of the DMD 53, but is oblique to the arrangement direction of the plurality of micromirrors. In other words, the arrangement direction of the plurality of light sources 54 is oblique to the diffraction direction. The angle formed between the arrangement direction of the plurality of light sources 54 and the diffraction direction is set to an angle other than 45°.

Also in the fourth embodiment, similarly to the first embodiment, the illuminance peak due to the zero-order light beam of the first light beam and the illuminance peaks due to the diffracted light beams of the second light beam are different from each other in the exit pupil C of the projection optical system 5. Thus, since the dispersibility of the plurality of illuminance peaks in the exit pupil C is enhanced, the variation in illuminance distribution becomes small, and as a result, the speckle becomes difficult to visually recognize.

It should be noted that the scope of the invention is not limited to the embodiments described above, but various modifications can be provided thereon within the scope or the spirit of the invention.

Figure 11A:
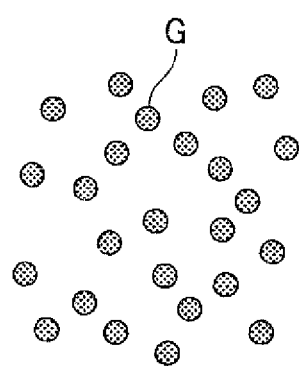
FIG. 11A is a diagram showing a modified example of the arrangement of the plurality of laser sources constituting the illumination device of the embodiment.
Figure 11B:
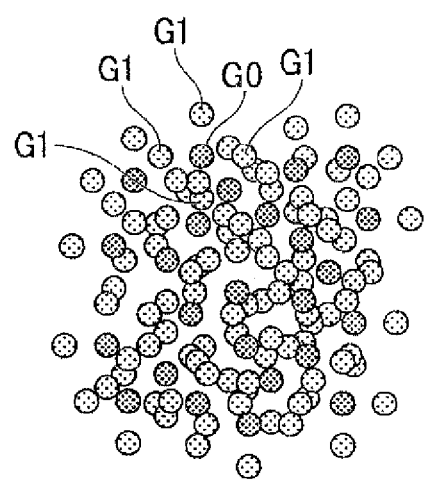
FIG. 11B is a diagram showing an exit pupil image of the example.

For example, in the embodiments described above, there is described the configuration having the plurality of laser sources arranged regularly at an equal pitch. However, it is also possible to randomly arrange the images G of the illumination light from the plurality of laser sources as shown in FIG. 11A instead of this configuration. Also in this case, the illuminance peaks (images G0) due to the zero-order light beam of the plurality of light beams are different from the illuminance peaks (the images G1) due to the diffracted light beams in the exit pupil C of the projection optical system 5 as shown in FIG. 11B. Thus, the variation in illuminance distribution becomes apparently small, and as a result, the speckle becomes difficult to visually recognize.

Further, in the exit pupil of the projection optical system, the distance between the first illuminance peak and the second illuminance peak adjacent to each other in the diffraction direction can also be different from the distance between the first illuminance peak and the third illuminance peak adjacent to each other in the diffraction direction. Here, the first illuminance peak, the second illuminance peak and the third illuminance peak is due to the plurality of zero-order light beams. In other words, the pitches between the illuminance peaks due to the zero-order light beams in the diffraction direction can also be different from each other.

Besides the above, the number, the arrangement, and so on of the variety of constituents of the projector disclosed in the embodiments described above can arbitrarily be modified.

The entire disclosure of Japanese Patent Application No. 2014-023655, filed on Feb. 10, 2014 is expressly incorporated by reference herein.

What is claimed is:

1. A projector comprising:
an illumination device adapted to emit a plurality of light beams, which includes a first light beam and a second light beam, as illumination light;
a light modulation device adapted to modulate the illumination light to thereby generate image light; and
a projection optical system having an exit pupil and adapted to project the image light, which is emitted from the light modulation device, on a projection target surface, the image light being formed of a plurality of diffracted light beams and a plurality of zero-order light beams, the plurality of diffracted light beams and the plurality of zero-order light beams being generated by the illumination light and the light modulation device, and the projection optical system receiving the plurality of diffracted light beams and the plurality of zero-order light beams generated by the illumination light and the light modulation device, and in the exit pupil, an illuminance peak due to the zero-order light beam corresponding to the first light beam being disposed at a position different from a position of an illuminance peak due to the diffracted light beam corresponding to the second light beam.

2. The projector according to claim 1, wherein
a plurality of illuminance peaks due to the plurality of diffracted light beams is arranged in the exit pupil in a first direction, the first direction intersecting with a direction in which a plurality of illuminance peaks due to the plurality of zero-order light beams is arranged in the exit pupil.

3. The projector according to claim 2, wherein
the illumination device is provided with a plurality of light sources, and
the direction in which the plurality of illuminance peaks due to the plurality of zero-order light beams is arranged coincides with a direction in which the plurality of light sources is arranged, in a plane perpendicular to an illumination light axis of the illumination device.

4. The projector according to claim 2, wherein
the illumination device is provided with a lens array having a plurality of lenses arranged, and
the direction in which the plurality of illuminance peaks due to the plurality of zero-order light beams is arranged coincides with a direction in which the plurality of lenses is arranged, in a plane perpendicular to an illumination light axis of the illumination device.

5. The projector according to claim 2, wherein
in the exit pupil, a distance between a first illuminance peak and a second illuminance peak adjacent to each other in the first direction is different from a distance between the first illuminance peak and a third illuminance peak adjacent to each other in the first direction, the first illuminance peak, the second illuminance peak and the third illuminance peak being due to the plurality of zero-order light beams.

* * * * *